US011613316B2

(12) United States Patent
Steiner et al.

(10) Patent No.: US 11,613,316 B2
(45) Date of Patent: Mar. 28, 2023

(54) FLIP-FLOP TRACK IDLERS

(71) Applicant: Caterpillar Inc., Peoria, IL (US)

(72) Inventors: Kevin L. Steiner, Tremont, IL (US); Eric Bernard Weisbruch, Edwards, IL (US); Daniel I. Knobloch, Morton, IL (US); Timothy Michael Nenne, Germantown Hills, IL (US)

(73) Assignee: Caterpillar Inc., Peoria, IL (US)

( * ) Notice: Subject to any disclaimer, the term of this patent is extended or adjusted under 35 U.S.C. 154(b) by 531 days.

(21) Appl. No.: 16/774,656

(22) Filed: Jan. 28, 2020

(65) Prior Publication Data

US 2021/0229764 A1    Jul. 29, 2021

(51) Int. Cl.
    *B62D 55/14*    (2006.01)
(52) U.S. Cl.
    CPC .................................. *B62D 55/14* (2013.01)
(58) Field of Classification Search
    CPC ...................................................... B62D 55/14
    See application file for complete search history.

(56) References Cited

U.S. PATENT DOCUMENTS

| | | | |
|---|---|---|---|
| 5,704,697 A | 1/1998 | Ketting et al. | |
| 6,851,768 B2* | 2/2005 | Takeno | B62D 55/21 |
| | | | 29/894.012 |
| 7,374,257 B2* | 5/2008 | Oertley | F16C 23/041 |
| | | | 305/136 |
| 8,770,677 B2 | 7/2014 | Yelistratov | |
| 8,979,219 B2* | 3/2015 | Hisamatsu | B62D 55/15 |
| | | | 305/136 |
| 9,868,482 B2* | 1/2018 | Rust | G01N 3/56 |
| 11,235,822 B2* | 2/2022 | Nagaoka | E02F 9/02 |
| 2012/0153714 A1 | 6/2012 | Yelistratov | |
| 2016/0121945 A1 | 5/2016 | Rust et al. | |
| 2016/0332683 A1* | 11/2016 | Johannsen | B62D 55/14 |
| 2017/0120971 A1 | 5/2017 | Kita et al. | |
| 2018/0208257 A1 | 7/2018 | Peterson | |
| 2021/0139092 A1* | 5/2021 | Hakes | B62D 55/15 |

FOREIGN PATENT DOCUMENTS

| | | |
|---|---|---|
| CN | 201980313 | 9/2011 |
| DE | 7309805 | 9/1973 |

* cited by examiner

*Primary Examiner* — Kevin Hurley

(57) ABSTRACT

A track idler includes a body of revolution defining an axis of rotation, a radial direction, and a circumferential direction disposed about the axis of rotation. A first axial extremity and a second axial extremity are disposed along the axis of rotation. The body of revolution further includes an outboard track contact surface that is disposed axially proximate to the first axial extremity, and an inboard slot is disposed axially proximate to the second axial extremity.

18 Claims, 10 Drawing Sheets

FLIP-FLOP TRACK IDLERS

TECHNICAL FIELD

The present disclosure relates to track idlers used in the undercarriage of heavy equipment using endless track drives. Specifically, the present disclosure relates to a track idler and track link interface used in such undercarriages that may be less prone to wear.

BACKGROUND

In many current applications, track rollers support the weight of heavy equipment such as those using endless track drives in the earth moving, construction, and mining industries, etc. Often, a bearing is supplied between the shaft on which the track roller rotates and the track roller. The pressure exerted on the track roller or the bearing may cause the track roller, track ling or bearing to wear.

Eventually, the track roller or track link may experience spalling or similar wear patterns. As a result, the machine is often taken out of service to replace the track roller or track link, or otherwise perform maintenance on the undercarriage of the machine. This may result in unwanted increased costs and reduced production for an economic endeavor using the machine.

U.S. Pat. No. 5,704,697 to Ketting discloses a rotatable drive/support element having a support surface that is used with a chain link having a hardened running surface extending in and adapted to ride in a travel direction on the support surface and a side surface also extending in the travel direction and normally out of contact with the element. The running surface has a predetermined width b and is formed of at least one edge region of an outwardly convex arcuate shape seen in the travel direction having a radius R of curvature and a respective corner region extending from the edge region to the side region of an outwardly convex arcuate shape see in the travel direction having a radius r of curvature. Ketting also discloses a ration of r/b that ranges from about 0.05 to 0.11, and preferably from about 2.4 to 3.1

As can be understood, the '697 patent is directed to arcuate configured interfaces between the track link and track roller, idler or the like in a purported effort to reduce contact pressures and the spalling of the track roller or the chain link. However, in some applications this design does not provide enough of a reduction in spalling.

SUMMARY

A track idler member according to an embodiment of the present disclosure is provided. The track idler member may comprise a body of revolution defining an axis of rotation, a radial direction, and a circumferential direction disposed about the axis of rotation. The body of revolution may also define a first axial end that is disposed along the axis of rotation, and a second axial end that is disposed along the axis of rotation. A half-tread portion may include a first track contact region including a first track contact surface that is disposed proximate to the first axial end, and may define a first void disposed axially between the first track contact region and the second axial end.

A track idler member according to another embodiment of the present disclosure is provided. The track roller idler member may comprise a body of revolution defining an axis of rotation, a radial direction, and a circumferential direction that is disposed about the axis of rotation. The body of revolution may also define a proximate axial end that is disposed along the axis of rotation, and a distal axial end that is disposed along the axis of rotation. A half-tread portion including a first track interface region may have an interface surface that is disposed proximate to the distal axial end, and may define a first aperture that is disposed axially between the first track interface region and the proximate axial end.

A track idler joint assembly according to an embodiment of the present disclosure is provided. The assembly may comprise a track idler including a body of revolution defining an axis of rotation, a circumferential direction disposed about the axis of rotation, a radial direction extending normal to the axis of rotation, a first axial extremity that is disposed along the axis of rotation, and a second axial extremity that is disposed along the axis of rotation. The body of revolution may include an outboard track contact surface that is disposed axially proximate to the first axial end. The body of revolution may further define an exterior, and an inboard slot that is disposed axially proximate to the second axial end. The assembly may further comprise an outboard link that contacts the outboard track contact surface and an inboard link overhanging the inboard slot.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings.

DETAILED DESCRIPTION

Figure 1:
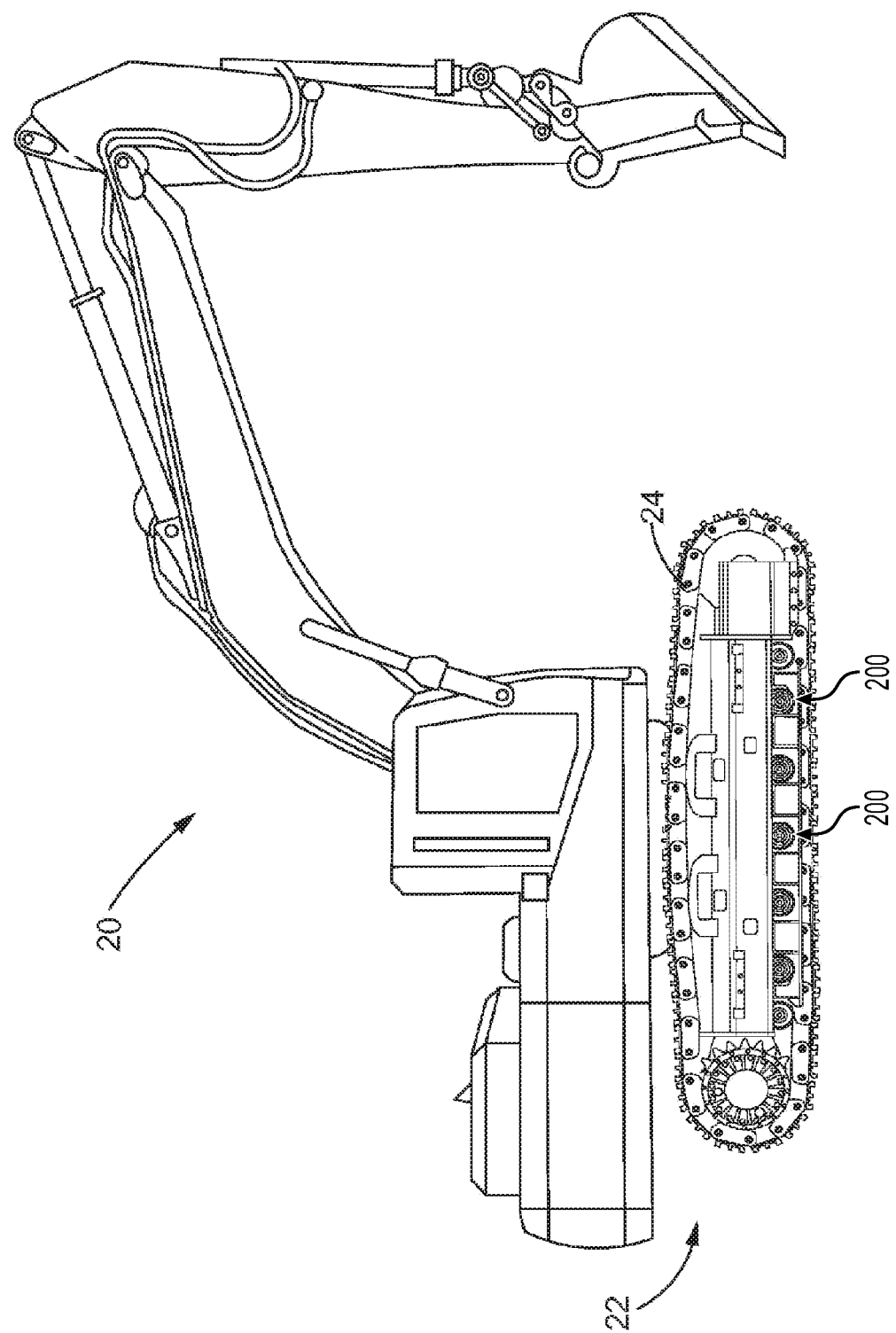
FIG. 1 is a perspective view of a machine such as an excavator that may employ a track assembly (may also be referred to as an undercarriage assembly) with a track roller with alternating contact regions that engage the outboard links versus the inboard links according to an embodiment of the present disclosure.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or by a prime for example, 100', 100" etc. It is to be understood that the use of letters or primes immediately after a reference number indicates that these features are similarly shaped and have similar function as is often the case when geometry is mirrored about a plane of symmetry. For ease of explanation in this specification, letters and primes will often not be included herein but may be shown in the drawings to indicate duplications of features, having similar or identical function or geometry, discussed within this written specification.

A roller joint assembly that may use a track roller or a track roller member according to various embodiments of the present disclosure will now be described. In some embodiments, the track roller is a solid body (e.g. having unitary construction). In other embodiments, the tracker roller is split into two or more track roller members that are assembled together to form the track roller or track roller joint assembly, etc. Other configurations for the track roller, track roller member, and track roller joint assembly are possible in other embodiments of the present disclosure.

FIG. 1 shows an embodiment of a tracked machine 20 in the form of an excavator that includes an embodiment of a track roller joint assembly 200 constructed in accordance with principles of the present disclosure. Among other uses, an excavator can be used to remove material using a bucket from a work site.

More specifically, FIG. 1 illustrates a machine 20 including an undercarriage system 22 with a track assembly 24, consistent with certain embodiments of the present disclosure. It is to be understood that although the machine 20 is illustrated as an excavator, the machine 20 may be of any other type that includes a tracked undercarriage system 22. As used herein, the term "machine" refers to a mobile machine that performs a driven operation involving physical movement associated with a particular industry, such as, earthmoving, construction, landscaping, forestry, agriculture, etc.

While the arrangement is illustrated in connection with an excavator, the arrangement disclosed herein has universal applicability in various other types of machines commonly employ track systems, as opposed to wheels. The term "machine" may refer to any machine that performs some type of operation associated with an industry such as mining, earth moving or construction, or any other industry known in the art. For example, the machine may be a hydraulic mining shovel, a wheel loader, a cable shovel, a track type tractor, a dozer, or dragline or the like. Moreover, one or more implements may be connected to the machine. Such implements may be utilized for a variety of tasks, including, for example, lifting and loading.

Figure 2:
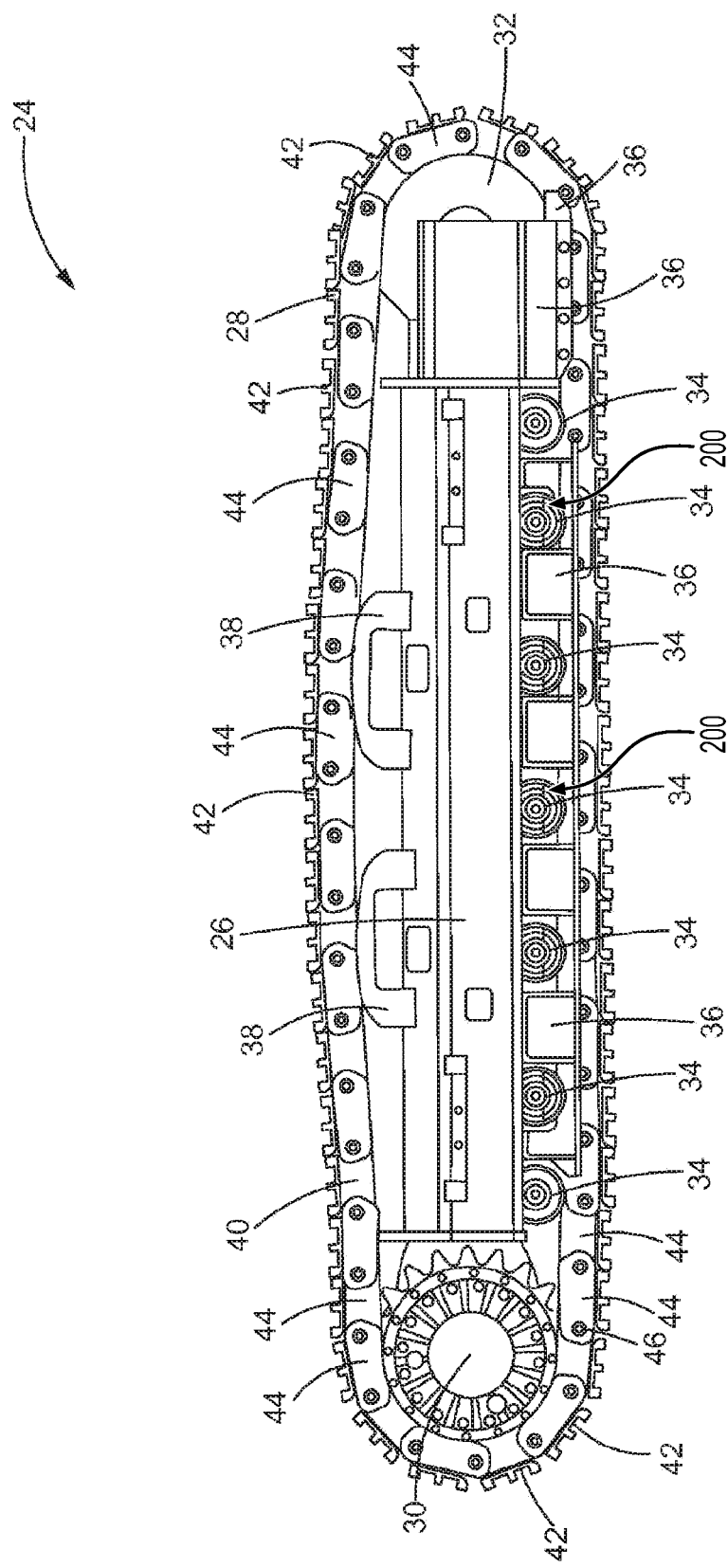
FIG. 2 is a side view of the undercarriage assembly for the machine of FIG. 1.
Figure 3:
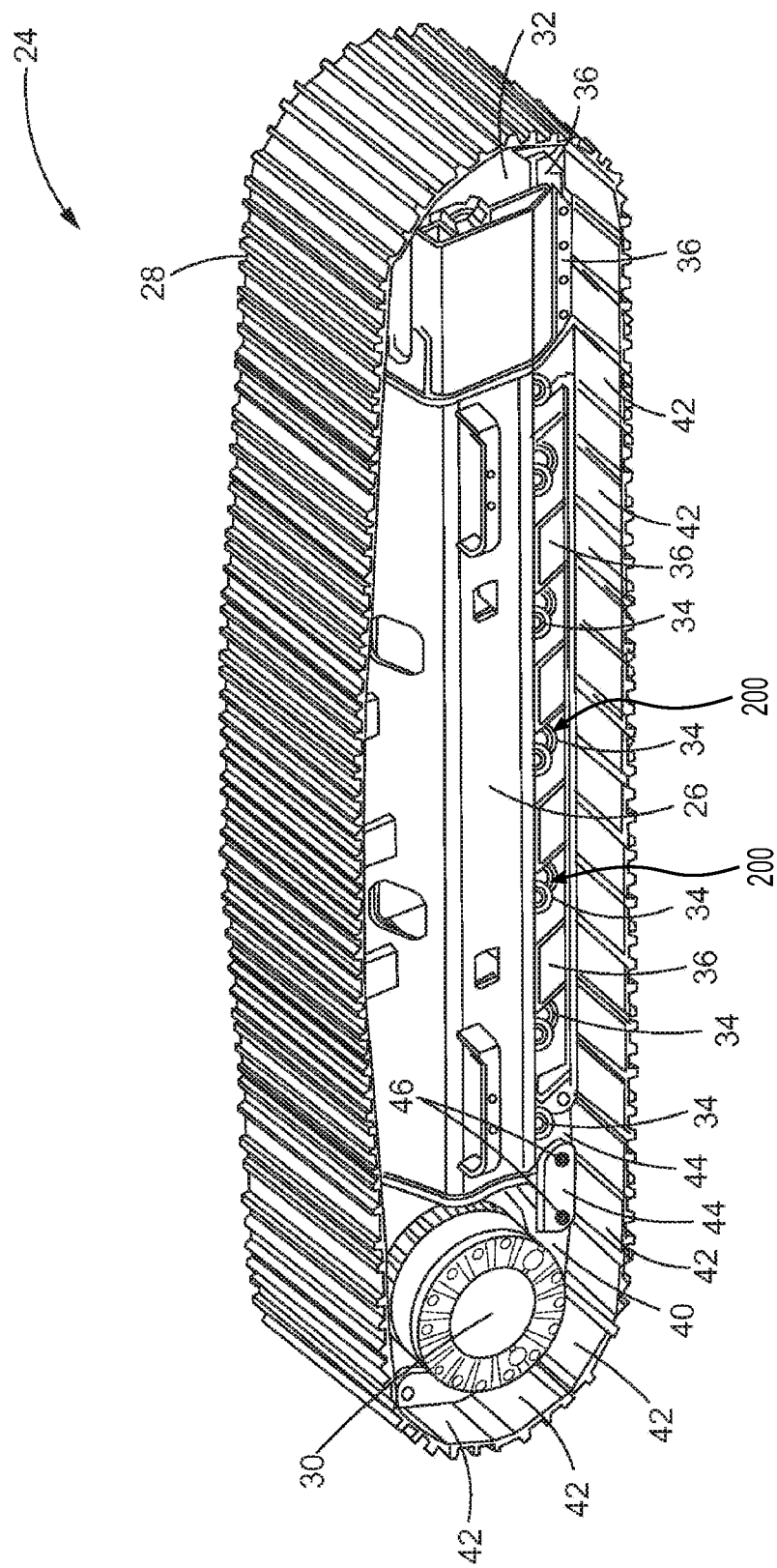
FIG. 3 is a perspective view of the undercarriage assembly of FIG. 2.

The undercarriage system 22 may be configured to support the machine 20 and move the machine 20 along the ground, road, and other types of terrain. As shown in FIGS. 2 and 3, the track assembly 24 of the undercarriage system 22 may include a track roller frame 26, various guiding components connected to the track roller frame 26, and an endless track 28 engaging the guiding components. The guiding components may guide the track 28 and include a drive sprocket 30, an idler 32, rollers 34, track guides 36, and carriers 38, although other components may be used The track 28 may include a link assembly 40 with a plurality of shoes 42 secured thereto. The link assembly 40 may form a flexible backbone of the track 28, and the shoes 42 may provide traction on the various types of terrain. The link assembly 40 may extend in an endless chain around the drive sprocket 30, the rollers 34, the idler 32, and the carriers 38.

As shown in FIGS. 2 and 3, track shoes 42 may be secured to the perimeter of link assembly 40. For example, one shoe 42 may be attached to each laterally spaced pair of links 44. The track shoes 42 may be connected to the links 44 via various methods (e.g. welding, fastening, etc.).

Figure 4:
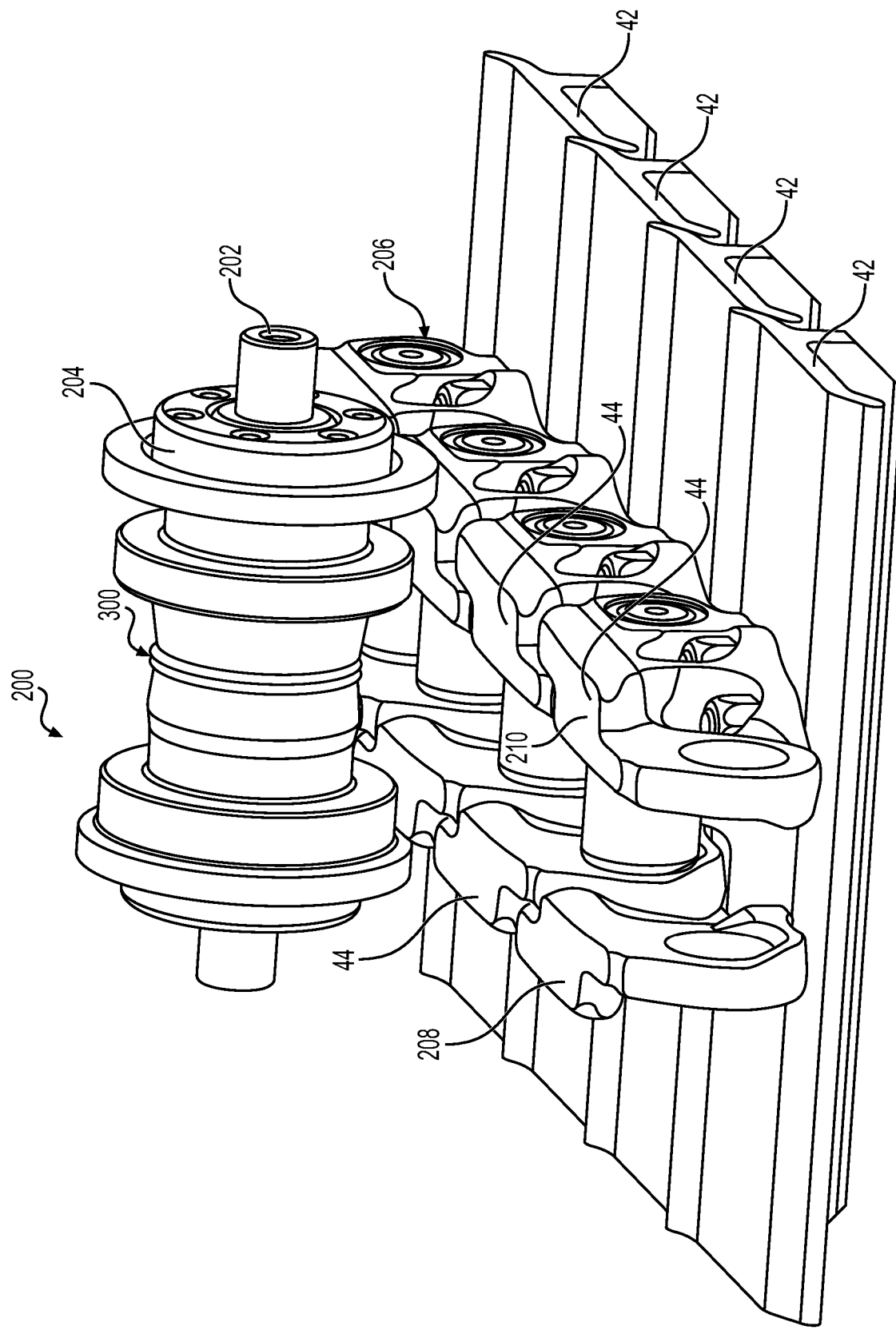
FIG. 4 is a perspective view of a track assembly mating with a track roller with alternating contact regions that engage the outboard links versus the inboard links according to an embodiment of the present disclosure.

As best understood with reference to FIGS. 1 and 4, a plurality of track roller joint assemblies 200 may be provided that guide the track chain assembly. The track roller joint assembly 200 includes shaft 202 extending from the frame (not shown in FIG. 4) of the undercarriage system 22 of the machine 20 on which the track roller 300 rotates.

Figure 5:
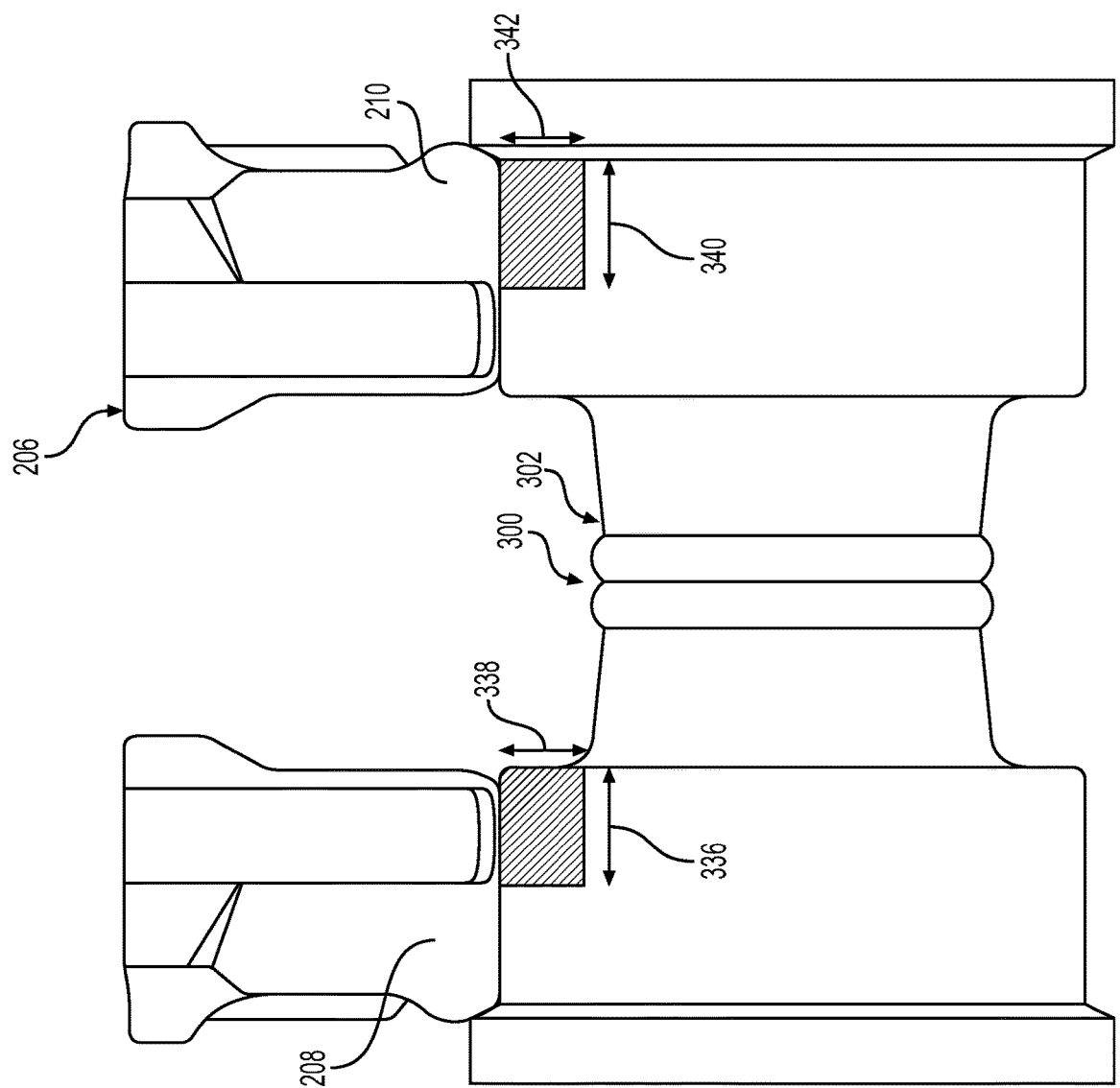
FIG. 5 is a front view of a portion of a track assembly with outboard links and inboard links that contact the alternating contact regions of a track roller formed by voids according to an embodiment of the present disclosure.
Figure 6:
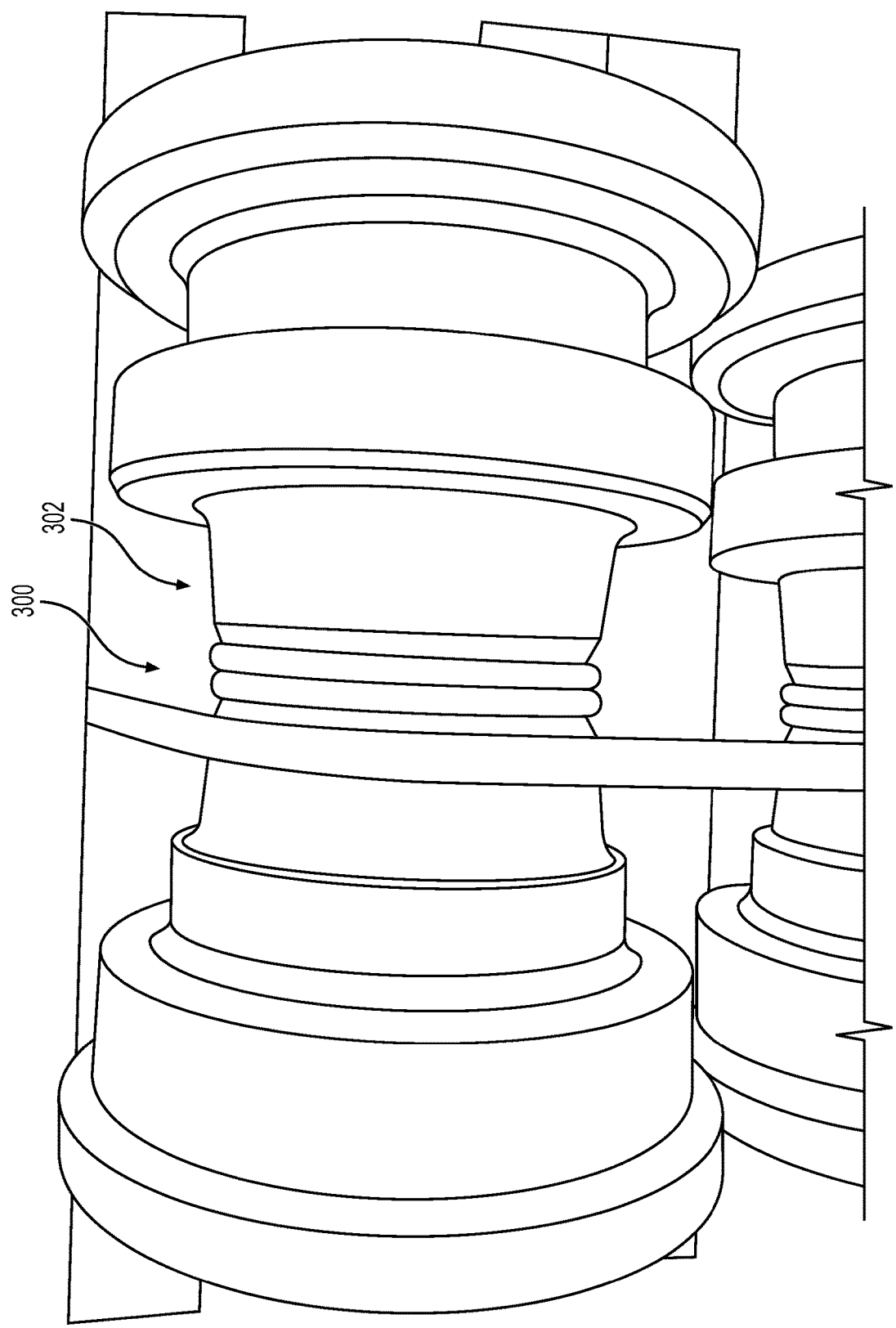
FIG. 6 is a perspective view of a track roller with alternating contact regions formed by rotating the voids about the axis of rotation of the track roller of FIG. 5. The track roller is shown packaged with a band to hold into place for shipping or storage.
Figure 7:
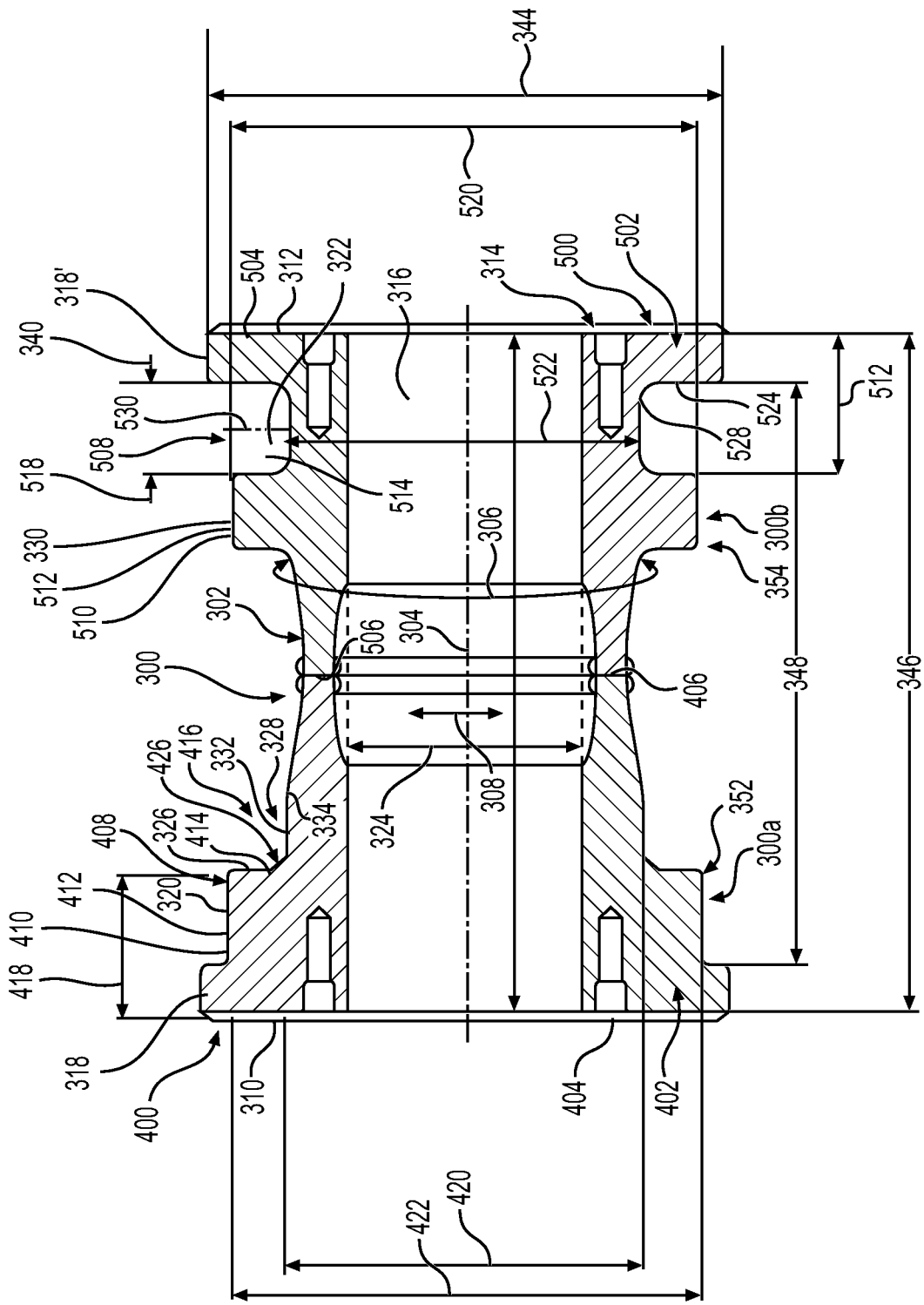
FIG. 7 is a front sectional view of the track roller of FIG. 6 shown in isolation and sectioned along a plane containing the radial direction and the axis of rotation.

Looking now at FIGS. 5 thru 7, it can be seen that the track roller 300 may include a body of revolution 302 (e.g. at least partially cylindrical, at least partially conical, etc.) defining an axis of rotation 304 (see FIG. 7), a circumferential direction 306 disposed about the axis of rotation 304, and a radial direction 308 extending normal to the axis of rotation 304. A first axial extremity 310 is disposed along the axis of rotation 304, and a second axial extremity 312 is disposed along the axis of rotation 304.

As used herein, the terms "axial" or "axially" includes a direction that makes an angle of less than 45 degrees with the axial direction while the terms "radial" or "radially" includes a direction that makes an angle of less than 45 degrees with the radial direction. "Purely" is meant to cover directions that are within 5 degrees of a stated direction. Relative terms such as "inboard" and "outboard" are to be understood to refer to a direction toward the interior of the machine or exterior of the machines respectively. However, it is to be understood that these terms may be switched by rotating a track roller joint assembly, a track roller, or a track roller members 180 degrees about a vertical axis. So, "inboard" and "outboard" should be interpreted broadly to cover embodiments where these features are so rotated. Similarly, the terms "roller" and "idler" as used herein may be used interchangeably to refer to any type of body of revolution. In general, an "idler" has a larger outer diameter as compared to a "roller" but not necessarily so.

As used herein, the articles "a" and "an" are intended to include one or more items, and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

The body of revolution 302 of the track roller 300 may further define an exterior 314, and a thru-hole 316 (see FIG. 7) that is in communication with the exterior 314 and extends axially through the body of revolution 302. A first rim portion 318 may be disposed proximate to the first axial extremity 310, and a second rim portion 318' may be disposed proximate to the second axial extremity 312. These features may be omitted in other embodiments. An outboard track contact surface 320 may be disposed axially proximate to the first rim portion 318, and an inboard slot 322 may be disposed axially proximate to the second rim portion 318'.

As can be understood with reference to FIG. 5, the inboard slot 322 may be formed by rotating a rectangular like cross-section about the axis of rotation and removing that material from the track roller 300. Other configurations of the inboard slot 322 or outboard slot 328 (as best seen in FIGS. 6 and 7) are possible in other embodiments of the present disclosure.

As best seen in FIG. 4, the shaft 202 may be disposed in the thru-hole 316, and a radial bearing 204 may be disposed in the thru-hole 316 that contacts the shaft 202. In other embodiments, the shaft may be integral with the body of the roller or the idler.

Looking at FIG. 7, the body of revolution 302 may further define a thru-hole minimum diameter 324, and may further include a purely radially inwardly extending segment 326 in a plane that contains the radial direction 308 and the axis of rotation 304. The purely radially inwardly extending segment 326 may be disposed axially proximate to the outboard track contact surface 320, and may at least partially define an outboard slot 328 that is disposed axially between the outboard track contact surface 320 and the inboard slot 322. An inboard track contact surface 330 may be disposed axially between the outboard slot 328, and the inboard slot 322.

A purely extending axial segment 332 may be provided that bounds the outboard slot 328, being spaced or offset radially inwardly away from the outboard track contact surface 320. This purely extending axial segment 332 may terminate at an end point 334 that is disposed axially between the outboard slot 328 and inboard track contact surface 330 such that the outboard slot 328 is open toward the second axial extremity 312. This might not be the case in other embodiments.

As shown in FIG. 5, an outboard slot axial width 336 may be measured from the purely radially inwardly extending segment 326 to the end point 335, and an outboard slot radial depth 338 that is measured from the outboard track contact surface 320 to the purely extending axial segment 332.

A ratio of the thru-hole minimum diameter 324 to the outboard slot axial width 336 ranges from 2.0 to 3.0, and a ratio of the thru-hole minimum diameter 324 to the outboard slot radial depth 338 ranges from 3.5 to 4.5. In such a case, the outboard slot axial width 336 may range from 50.0 mm to 60.0 mm (e.g. about 54.0 mm), and the outboard slot radial depth 338 may range from 30.0 mm to 40.0 mm (e.g. about 35.0 mm).

As also understood with reference to FIG. 5, the inboard slot 322 may define an inboard slot axial width 340, and an inboard slot radial depth 342. A ratio of the thru-hole minimum diameter 324 to the inboard slot axial width 340 may ranges from 2.0 to 3.0, and a ratio of the thru-hole minimum diameter 324 to the inboard slot radial depth 342 may range from 3.5 to 4.5. In such a case, the inboard slot axial width 340 may range from 50.0 mm to 60.0 mm (e.g. about 54.0 mm), and the inboard slot radial depth 342 may range from 30.0 mm to 40.0 mm (e.g. about 34.0 mm).

Referring now to FIG. 7, the first rim portion 318 and/or the second rim portion 318' define an overall diameter 344 of the track roller 300, an overall axial length 346 of the track roller 300, and a track link receiving barrel 348 defining a barrel axial width 350.

In some embodiments, the overall diameter 344 may range from 300.0 mm to 350.0 mm (e.g. about 321.0 mm), the overall axial length 346 may range from 350.0 mm to 450.0 mm (e.g. about 410.0 mm), and the barrel axial width 350 may range from 300.0 mm to 400.0 mm (e.g. about 342.8 mm).

Referring back to FIGS. 4 and 5, a track chain 206 including a plurality of track links 208 including a plurality of outboard portions 208 and a plurality of inboard portions 210 may be in contact with the track roller.

Looking at FIG. 7, the track roller 300 may be split into a first track roller member 300a, and a second track roller member 300b that are arranged axially in series, being attached to each other via welding, fastening, etc. The first roller member 300a may having a first half-tread portion 352 that is configured to contact at least one of the plurality of outboard portions 208 of the track chain 206, and the second roller member 300b may have a second half-tread portion 354 that is configured to contact at least one of the plurality of inboard portions 210 of the track chain 206. In other embodiments, the track roller 300 may constitute a single piece (or unitary construction).

This "flip-flop" arrangement may reduce the contact points between the roller and the track links into half, and may double the pressure on the track links. Furthermore, the flip-flop roller maybe designed larger in diameter to compensate for reduced roller material. This may improve the track link life. Unexpectedly, tests have shown that even with commensurately higher contact pressures from reducing "contact" points, the wear life of the track links may be improved.

In other words, the track links may contact certain portions of the track roller and overhang the slots, increasing the contact pressures, which has unexpectedly been shown to increase the wear life of the track links, etc.

Any of the aforementioned features may be varied to be different than described herein or shown in the drawings. Also, any of the ranges of ratios or dimensions may also be varied in other embodiments to be different than described herein or shown in the drawings.

A track roller member 400 that may be used as part of the track roller 300 just described or as a replacement part will now be described with reference to FIG. 7.

The track roller member 400 may have a body 402 with a first axial end 404, and a second axial end 406 that are disposed along the axis of rotation 304. The body 402 may have a half-tread portion 408 including a first track contact region 410 having a first track contact surface 412 that is disposed axially proximate to the first axial end 404 (e.g. closer to the first axial end as compared to the second axial end), and defining a first void 416 that is disposed axially between the first track contact region 410 and the second axial end 406. The first void 414 may have any suitable configuration including a groove, a slot, a hole, etc.

A radially inwardly extending segment 414 is provided that at least partially defines the first track contact region 410, and the first void 416. The body 402 may further define a minimum axial distance 418 from the first axial end 404 to the radially inwardly extending segment 414. The first void 416 may define a first void minimum diameter 420.

In some embodiments, a ratio of the thru-hole minimum diameter 324 to the minimum axial distance 418 may ranges from 1.0 to 2.0, and a ratio of the first void minimum diameter 420 to the thru-hole minimum diameter 324 may range from 1.0 to 2.0.

In such a case, the thru-hole minimum diameter 324 may range from 100.0 mm to 200.0 mm (e.g. about 142.0 mm), the minimum axial distance 418 may range from 60.0 mm to 100.0 mm (e.g. about 83.0 mm), and the first void minimum diameter 420 may range from 150.0 mm to 300.0 mm (e.g. about 217.0 mm). Also, the first track contact surface 412 may define a first track contact region diameter 422 ranging from 250.0 mm to 325.0 mm (e.g. about 287.0 mm).

With continued reference to FIG. 7, the body 402 may further define a plurality of segments in the plane containing the radial direction 308, and the axis of rotation 304, forming the first void 416. The plurality of segments may include the radially inwardly extending segment 414 that is interposed radially between the first track contact surface 412, and the first void minimum diameter 420. An axially extending segment 424 may define the first void minimum diameter 420, and a radius 426 may connect the radially inwardly extending segment 414 to the axially extending segment 424. In some embodiments, the radius 426 may define a radius of curvature ranging from 10.0 mm to 20.0 mm (e.g. 15.0 mm).

Any of these features may be differently configured or dimensioned in other embodiments of the present disclosure. The ratios are also given as an example and not in any limiting sense.

Another track roller member 500 that may be used as part of the track roller 300 described above herein or as a replacement part will now be described with reference to FIG. 7.

The track roller member 500 may comprise a body 502 including a proximate axial end 504 that is disposed along the axis of rotation 304, and a distal axial end 506 that is disposed along the axis of rotation 304. A half-tread portion 508 including a first track interface region 510 including an interface surface 512 that is disposed proximate to the distal axial end 506, and defining a first aperture 514 that is disposed axially between the first track interface region 510 and the proximate axial end 504. The first aperture 514 may have any suitable configuration including a groove, a slot, a hole, etc.

The first track interface region 512 may be spaced away a minimum axial dimension 514 from the proximate axial end 504. The first aperture 514 may also define a first aperture axial width 518.

In some embodiments, a ratio of the thru-hole minimum diameter 324 to the minimum axial dimension 516 ranges from 1.0 to 2.0, and a ratio of the thru-hole minimum diameter 324 to the first aperture axial width 518 ranges from 2.0 to 3.0. In such a case, the thru-hole minimum diameter 324 may range from 100.0 mm to 200.0 mm (e.g. about 142.0 mm), the minimum axial dimension 516 may range from 60.0 mm to 100.0 mm (e.g. about 83.0 mm), and the first aperture axial width 518 may range from 40.0 mm to 70.0 mm (e.g. about 54.0 mm).

In addition, the interface surface 512 may define a first track interface region diameter 520 ranging from 250.0 mm to 325.0 mm (e.g. about 287.0 mm), and the first aperture 514 may define a first aperture minimum diameter 522 that ranges from 150.0 mm to 300.0 mm (e.g. about 217.0 mm).

With continued reference to FIG. 7, the body 502 may define a plurality of segments in the plane containing the radial direction 308, and the axis of rotation 304, forming the first aperture 514. The plurality of segments may include a first radially inwardly extending segment 524 that is interposed axially between the proximate axial end 504, and the first aperture minimum diameter 522, an axially extending segment 526 defining the first aperture minimum diameter 522, and a first blend 528 connecting the first radially inwardly extending segment 524 and the axially extending segment 526. The first blend 528 may define a radius of curvature ranging from 10.0 mm to 20.0 mm (e.g. about 15.0 mm) in some embodiments. Also, and the body 502 may also a plane of symmetry 530 that is parallel to the radial direction 308 such that the first aperture 514 is symmetrical about the plane of symmetry 530. This may not be the case for other embodiments of the present disclosure.

For many embodiments, the track roller or track roller member may be cast using iron, grey-iron, steel or other suitable materials. Other materials may be used as well as other manufacturing processes to make the track roller or track roller member such as any type of machining, forging, etc. Also, the configurations of any of the features discussed herein, as well as their dimensions, and/or their ratios of dimensions may be different than what has been specifically stated herein depending on the intended application.

Next, various embodiments of a track idler joint assembly and track idler members that are similarly configured as the track roller joint assembly or the track roller, or track roller member as just described above will now be discussed in detail with reference to FIGS. 8 thru 10.

Figure 8:
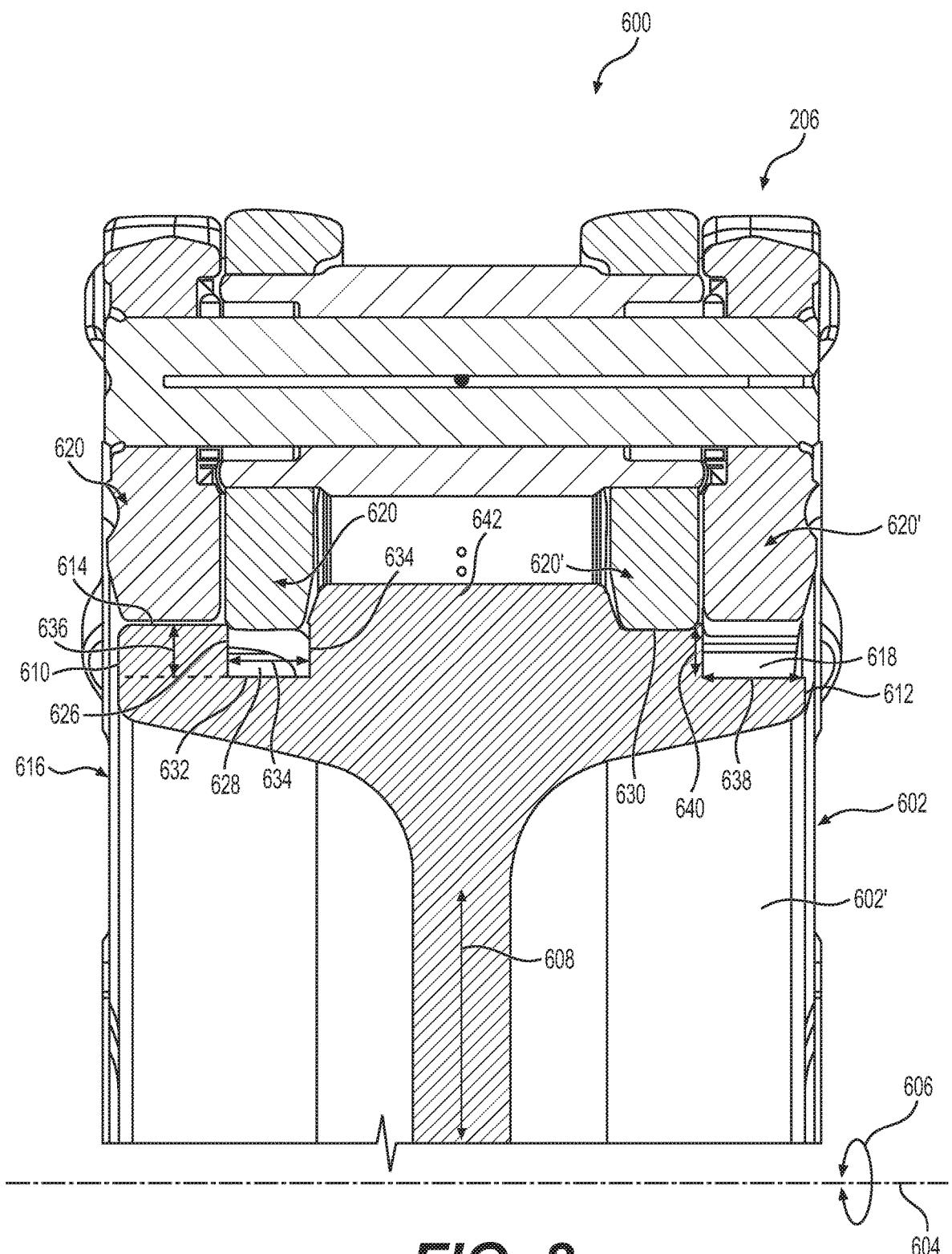
FIG. 8 is a sectioned view of a track assembly mating with a track idler with alternating contact regions that engage the outboard links versus the inboard links according to an embodiment of the present disclosure.

Starting with FIG. 8, a track idler joint assembly 600 may comprise a track idler 602 including a body 602' of revolution (so called since the body may be modeled by at least partially revolving a cross-section of geometry around an axis, and/or actually revolves around an axis in use) defining an axis of rotation 604, a circumferential direction 606 disposed about the axis of rotation 604, and a radial direction 608 extending normal to the axis of rotation 604. A first axial extremity 610 may be disposed along the axis of rotation 604, and a second axial extremity 612 may also be disposed along the axis of rotation 604. The body 602' of revolution may further include an outboard track contact surface 614 that is disposed axially proximate to the first axial extremity 610. The body 602' of revolution may further define an exterior 616, and an inboard slot 618 that is disposed axially proximate to the second axial extremity 612. An outboard link 620 may be provided that contacts the outboard track contact surface 614, and an inboard link 620' may also be provided that overhangs the inboard slot 618.

Figure 10:
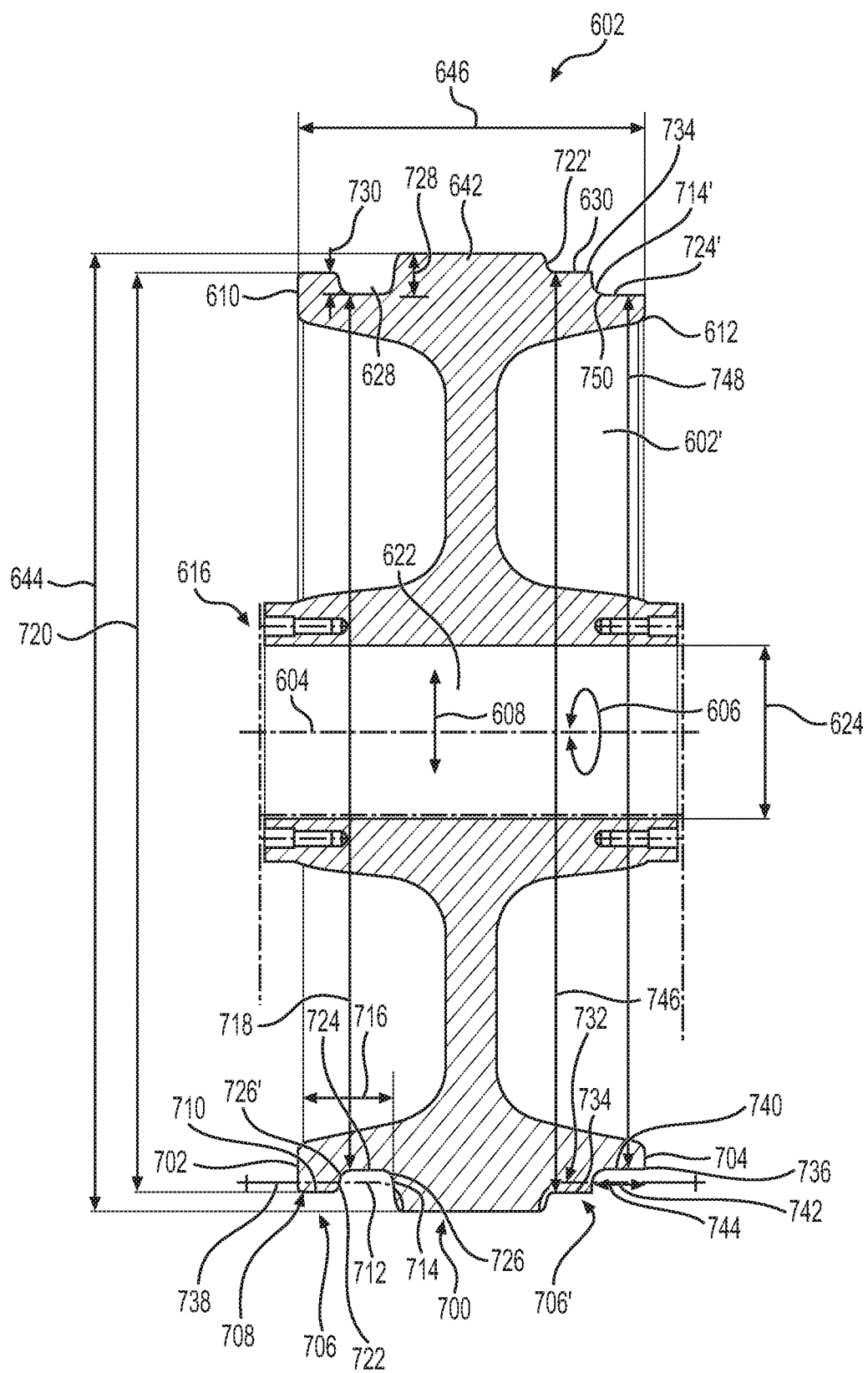
FIG. 10 is a sectional view of the track idler of FIG. 9 taken along lines 10-10 thereof with the shaft removed for enhanced clarity.

As best seen in FIG. 10, the body 602' of revolution may further define a thru-hole 622 that is in communication with the exterior 616, and that extends axially through the body 602' of revolution. The thru-hole 622 defines a thru-hole minimum diameter 624.

With continued reference to FIG. 8, the body 602' of revolution further includes a purely radially inwardly extending segment 626 in a plane that contains the radial direction 608 and the axis of rotation 604. The purely radially inwardly extending segment 626 may be disposed axially proximate to the outboard track contact surface 614, and at least partially defines an outboard slot 628 that is disposed axially between the outboard track contact surface 614 and the inboard slot 618. An inboard track contact surface 630 is disposed axially between the outboard slot 628 and the inboard slot 618. The outboard link 620 overhangs the outboard slot 628, and the inboard link 620' contacts the inboard track contact surface 630.

Figure 9:
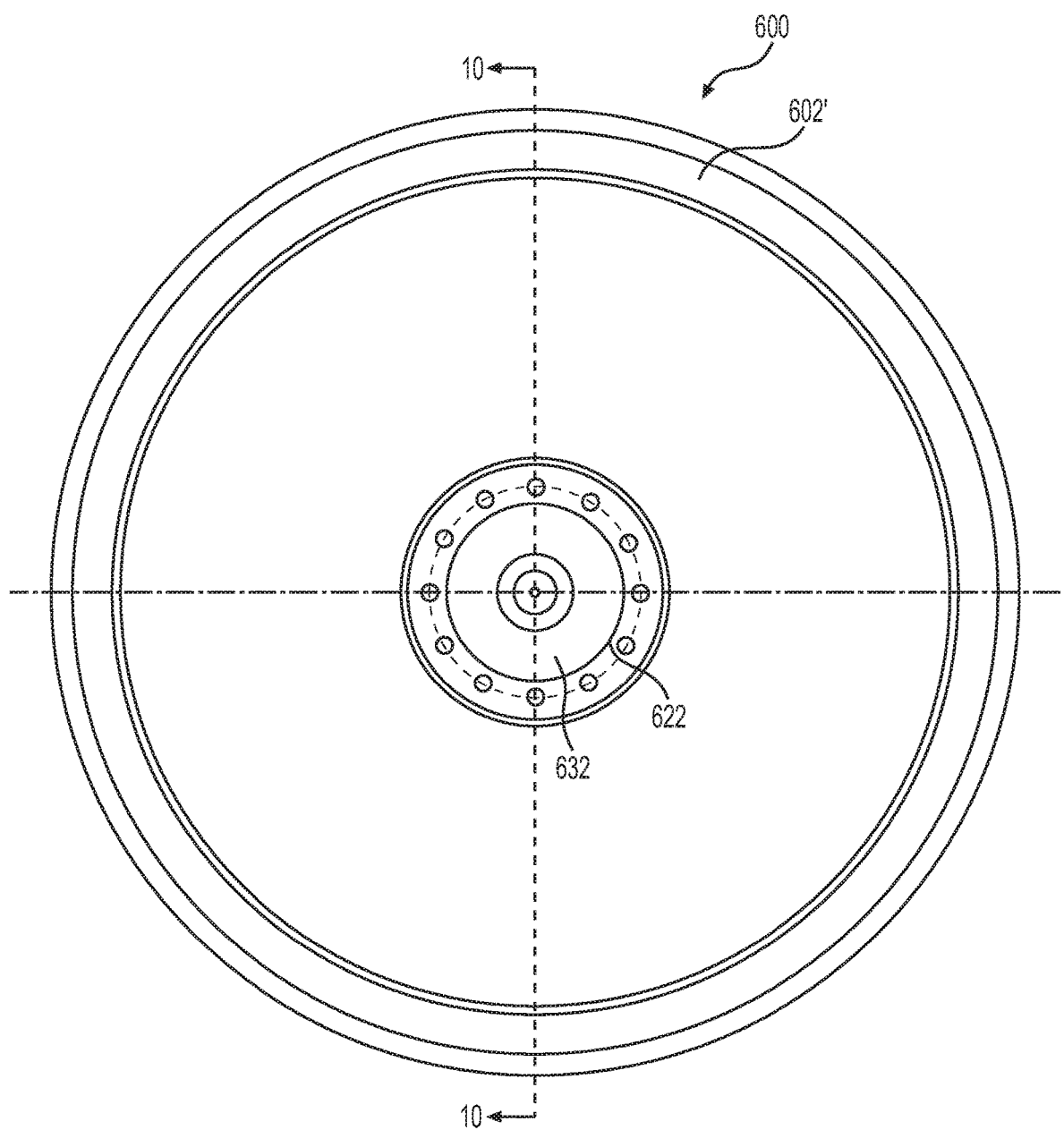
FIG. 9 is a side view of the track idler of FIG. 8 mounted on a shaft with the track chain removed for enhanced clarity.

As best seen in FIG. 9, a shaft 632 may be disposed in the thru-hole 622, or may be integral with the track idler or the track roller in other embodiments of the present disclosure. In such a case, the thru-hole may be omitted from the track idler or the track roller. When the thru-hole is provided, the body 602' of revolution may have a revolved configuration.

Returning to FIG. 8, the body 602' of revolution includes a purely extending axial segment 632 that is radially inwardly offset from the outboard track contact surface 614. The body 602' of revolution further defines an outboard slot axial width 634, and an outboard slot radial depth 636 that is measured from the outboard track contact surface 614 to the purely extending axial segment 632.

In some embodiments, a ratio of the thru-hole minimum diameter 624 to the outboard slot axial width 634 may range from 2.5 to 3.5, and a ratio of the thru-hole minimum diameter 624 to the outboard slot radial depth 636 may range from 7.0 to 8.5. In such a case, the outboard slot axial width 634 may range from 50.0 mm to 60.0 mm (e.g. about 54.1 mm), and the outboard slot radial depth 636 may range from 15.0 mm to 30.0 mm (e.g. about 21.0 mm).

Similarly, the body 602' of revolution may define an inboard slot axial width 638 that is measured from the inboard track contact surface 630 to the second axial extremity 612, and an inboard slot radial depth 640.

In some embodiments, a ratio of the thru-hole minimum diameter 624 to the inboard slot axial width 638 may range from 2.5 to 3.5, and a ratio of the thru-hole minimum diameter 624 to the inboard slot radial depth 640 may range from 7.0 to 8.5. In such a case, the inboard slot axial width 638 may range from 45.0 mm to 55.0 mm (e.g. about 51.2 mm), and the inboard slot radial depth 640 may range from 15.0 mm to 30.0 mm (e.g. about 21.0 mm). Also, the thru-hole minimum diameter 624 may range from 100.0 mm to 200.0 mm (e.g. about 168.89 mm).

As also shown in FIGS. 8 and 10, the track idler 602 may further comprise a center ridge 642 that fits between the outboard link 620 and the inboard link 620' to keep the track chain centered on the track idler 602, and from falling off the track idler 602. To that end, the center ridge 642 may define an overall diameter 644 (i.e. diameter of greatest extent as shown in FIG. 10) of the track idler 602, and is disposed axially between the outboard slot 628 and the inboard track contact surface 630. Also, the body 602' of revolution may define a barrel axial length 646 of the track idler 602 measured from the first axial extremity 610 to the second axial extremity 612.

In some embodiments, the overall diameter 644 of the track idler 602 may range from 875.0 mm to 975.0 mm (e.g. about 932.0 mm), and the barrel axial length 646 of the track idler 602 ranges from 300.0 mm to 400.0 mm (e.g. about 338.0 mm).

The track idler 602 may comprise a unitary body of revolution such as when it is cast or forge from a single piece of material. In order to facilitate such a manufacturing process, the cross-section of the body 602' of revolution may have an I-beam configuration to maintain a nominal wall thickness. In other embodiments, the track idler may be made from one or more track idler members that are assembled together, etc. In addition, the track idler or track idler member(s) may be manufactured using any process or material described earlier herein with reference to a track roller or track roller member, etc.

Any of these features may be differently configured or dimensioned in other embodiments of the present disclosure. The ratios are also given as an example and not in any limiting sense.

A track idler member that may be provided as a replacement part or as a retrofit in the field will now be discussed with reference to FIG. 10.

Starting at the bottom left portion of FIG. 10, the track idler member 700 may comprise a body 602' of revolution defining an axis of rotation 604, a radial direction 608, and a circumferential direction 606 that is disposed about the axis of rotation 604. The body 602' of revolution may define a first axial end 702 that is disposed along the axis of rotation 604, and a second axial end 704 that is also disposed along the axis of rotation 604.

The track idler member 700 may also include a half-tread portion 706 including a first track contact region 708 that has a first track contact surface 710 that is disposed proximate to the first axial end 702, and defining a first void 712 that is disposed axially between the first track contact region 708 and the second axial end 704.

The body 602' of revolution may further define a thru-hole 622 that extends axially through the body 602' of revolution that is centered on the axis of rotation 604, and that has a thru-hole minimum diameter 624. The body 602' may include a first radially inwardly extending segment 714 in a plane that contains the radial direction 608, and the axis of rotation 604. The first radially inwardly extending segment 714 may at least partially define the first void 712, and is spaced away from the first track contact region 708 along the axis of rotation 604.

The body 602' may further define a minimum axial distance 716 from the first axial end 702 to the first radially inwardly extending segment 714. Also, the first void 712 may define a first void minimum diameter 718.

In some embodiments, a ratio of the thru-hole minimum diameter 624 to the minimum axial distance 716 may range from 1.0 to 2.0, and a ratio of the first void minimum diameter 718 to the thru-hole minimum diameter 624 may range from 4.0 to 6.0.

In such a case, the thru-hole minimum diameter 624 may range from 100.0 mm to 200.0 mm (e.g. 168.89 mm), the minimum axial distance may range from 75.0 mm to 125.0 mm (e.g. 94.0 mm), and the first void minimum diameter may range from 800.0 mm to 900.0 mm (e.g. 850.0 mm).

Likewise, the first track contact surface 710 may define a first track contact region diameter 720 that may range from 850.0 mm to 950.0 mm (e.g. 892.0 mm).

More specifically, the body 602' may define a plurality of segments in the plane containing the radial direction 608 and the axis of rotation 604, forming the first void 712. The plurality of segments may include the first radially inwardly extending segment 714, and a second radially inwardly extending segment 722 that is interposed radially between the first track contact surface 710 and the first void minimum diameter 718. An axially extending segment 724 may define the first void minimum diameter 714.

Also, a first blend 726 may connect the first radially inwardly extending segment 714 to the axially extending segment 724. Similarly, a second blend 726' may connect the second radially inwardly extending segment 722 to the axially extending segment 724. The first blend 726 or the second blend 726' may define a radius of curvature ranging from 10.0 mm to 20.0 mm (e.g. about 15.0 mm), the first radially inwardly extending segment 714 may define a first radial length 728, and the second radially inwardly extending segment 722 may define a second radial length 730 that is less than the first radial length 728. As a result the first radially inwardly extending segment 714 may define the side of the center ridge 642 as previously described herein.

Another embodiment of the track idler member 700 may be described as follows with continued reference to FIG. 10.

Looking at the bottom right portion of the track idler member 700 in FIG. 10, another half-tread portion 706' may include a first track interface region 732 including an interface surface 734 that is disposed axially between the proximate axial end 736 and the distal axial end 738. A first aperture 740 may be disposed axially between the first track interface region 732 and the proximate axial end 736.

The first track interface region 732 may be spaced away a minimum axial dimension 742 from the proximate axial end 736, and the first aperture 740 may define a first aperture axial width 744.

In some embodiments, a ratio of the thru-hole minimum diameter 624 to the minimum axial dimension 742 may range from 2.5 to 3.5, and a ratio of the thru-hole minimum diameter 624 to the first aperture axial width 744 may range from 2.5 to 3.5.

In such a case, the thru-hole minimum diameter 624 may range from 100.0 mm to 200.0 mm (e.g. about 168.89 mm), the minimum axial dimension 742 ranges from 30.0 mm to 70.0 mm (e.g. about 51.2 mm), and the first aperture axial width 744 may also range from 30.0 mm to 70.0 mm (e.g. about 51.2 mm). So, the first aperture may extend all the way to the proximate axial end when 742 equals 744 but not necessarily so.

Also, the interface surface 734 may define a first track interface region diameter 746 ranging from 850.0 mm to 950.0 mm (e.g. 892.00 mm), and the first aperture 740 may define a first aperture minimum diameter 748 (see upper right portion of FIG. 10) that ranges from 800.0 mm to 900.0 mm (e.g. 850.00 mm).

The first aperture 740 may be bounded by a plurality of segments including a first radially inwardly extending segment 714' (see upper right portion of FIG. 10) that is interposed axially between the proximate axial end 736 and the interface surface 734. An axially extending segment 724' may define the first aperture minimum diameter 748. A first blend 750 may connect the first radially inwardly extending segment 714' to the axially extending segment 724'. The first blend 750 may define a radius of curvature ranging from 10.0 mm to 20.0 mm (e.g. about 15.0 mm). Also, a second radially inwardly extending segment 722' may be spaced radially outwardly from the interface surface 734, and the first radially inwardly extending segment 722'. This arrangement may form a stepped configuration.

The configurations of any of the features discussed herein, as well as their dimensions, and/or their ratios of dimensions may be different than what has been specifically stated herein depending on the intended application.

INDUSTRIAL APPLICABILITY

In practice, a track roller, a track idler, a track roller member, a track idler member, a track roller joint assembly, a track idler joint assembly, and an undercarriage assembly according to any embodiment described herein may be sold, bought, manufactured or otherwise obtained in an OEM (Original Equipment Manufacturer) or after-market context.

The various embodiments of the track roller, track idler, track roller member, track idler member, track roller joint assembly, or a track idler joint assembly may improve the wear life of the track links or other components of the track roller/idler joint assembly by increasing the contact pressures created at the interface between the track roller/idler and the track links. This provides an unexpected result since convention wisdom is that decreasing contact pressures usually improve wear life rather than increasing contact pressures.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:

1. A track idler member comprising:
a body of revolution defining an axis of rotation, a radial direction, and a circumferential direction disposed about the axis of rotation, the body of revolution defining
a first axial end disposed along the axis of rotation and a second axial end disposed along the axis of rotation; and
a half-tread portion including a first track contact region including a first track contact surface that is disposed proximate to the first axial end, and defining a first void disposed axially between the first track contact region and the second axial end, wherein the body of revolution further defines a thru-hole extending axially through the body of revolution that is centered on the axis of rotation, and a thru-hole minimum diameter and further includes a first radially inwardly extending segment in a plane that contains the radial direction and the axis of rotation, the first radially inwardly extending segment at least partially defines the first void and is spaced away from the first track contact region along the axis of rotation, and wherein the body further defines a minimum axial distance from the first axial end to the first radially inwardly extending segment, the first void defines a first void minimum diameter, a ratio of the thru-hole minimum diameter to the minimum axial distance ranges from 1.0 to 2.0, and a ratio of the first void minimum diameter to the thru-hole minimum diameter ranges from 4.0 to 6.0.

2. The track idler member of claim 1 wherein the thru-hole minimum diameter ranges from 100.0 mm to 200.0 mm, the minimum axial distance ranges from 75.0 mm to 125.0 mm, and the first void minimum diameter ranges from 800.0 mm to 900.0 mm.

3. The track idler member of claim 2 wherein the first track contact surface defines a first track contact region diameter ranging from 850.0 mm to 950.0 mm.

4. The track idler member of claim 3 wherein the body defines a plurality of segments in the plane containing the radial direction and the axis of rotation, forming the first void, the plurality of segments including the first radially inwardly extending segment, and a second radially inwardly extending segment that is interposed radially between the first track contact surface and the first void minimum diameter, an axially extending segment defining the first void minimum diameter, a first blend connecting the first radially inwardly extending segment and the axially extending segment, and a second blend connecting the second radially inwardly extending segment and the axially extending segment, the first blend or the second blend defining a radius of curvature ranging from 10.0 mm to 20.0 mm, the first radially inwardly extending segment defining a first radial length, and the second radially inwardly extending segment defining a second radial length that is less than the first radial length.

5. A track idler member comprising:
a body of revolution defining an axis of rotation, a radial direction, and a circumferential direction disposed about the axis of rotation, the body of revolution defining
a proximate axial end disposed along the axis of rotation, and a distal axial end disposed along the axis of rotation; and
a half-tread portion including a first track interface region including an interface surface that is disposed axially between the proximate axial end and the distal axial end, and defining a first aperture disposed axially between the first track interface region and the proximate axial end, wherein the body of revolution further defines a thru-hole extending axially through the body of revolution that is centered on the axis of rotation, and a thru-hole minimum diameter, the first track interface region is spaced away a minimum axial dimension from the proximate axial end, the first aperture defines a first aperture axial width, a ratio of the thru-hole minimum diameter to the minimum axial dimension ranges from 2.5 to 3.5, and a ratio of the thru-hole minimum diameter to the first aperture axial width ranges from 2.5 to 3.5.

6. The track idler member of claim 5 wherein the thru-hole minimum diameter ranges from 100.0 mm to 200.0 mm, the minimum axial dimension ranges from 30.0 mm to 70.0 mm, and the first aperture axial width ranges from 30.0 mm to 70.0 mm.

7. The track idler member of claim 6 the interface surface defines a first track interface region diameter ranging from 850.0 mm to 950.0 mm, and the first aperture defines a first aperture minimum diameter that ranges from 800.0 mm to 900.0 mm.

8. The track idler member of claim 7 wherein the body of revolution defines a plurality of segments in the plane containing the radial direction and the axis of rotation, forming the first aperture, the plurality of segments including a first radially inwardly extending segment that is interposed axially between the proximate axial end and the interface surface, an axially extending segment defining the first aperture minimum diameter, and a first blend connecting the first radially inwardly extending segment and the axially extending segment, the first blend defining a radius of curvature ranging from 10.0 mm to 20.0 mm, a second radially inwardly extending segment spaced radially outwardly from the interface surface, and the first radially inwardly extending segment.

9. A track idler joint assembly comprising:
a track idler including
a body of revolution defining an axis of rotation, a circumferential direction disposed about the axis of rotation, a radial direction extending normal to the axis of rotation, a first axial extremity disposed along the axis of rotation, and a second axial extremity disposed along the axis of rotation, the body of revolution further including
an outboard track contact surface disposed axially proximate to the first axial extremity; and the body of revolution further defining
an exterior;
an inboard slot that is disposed axially proximate to the second axial extremity; and an outboard link contacting the outboard track contact surface and an inboard link overhanging the inboard slot.

10. The track idler joint assembly of claim 9 wherein the body of revolution further defines a thru-hole that is in communication with the exterior and extending axially through the body of revolution, and a thru-hole minimum diameter and further includes
a purely radially inwardly extending segment in a plane that contains the radial direction and the axis of rotation, the purely radially inwardly extending segment is disposed axially proximate to the outboard track contact surface, and at least partially defines an outboard slot that is disposed axially between the outboard track contact surface and the inboard slot;
an inboard track contact surface that is disposed axially between the outboard slot and the inboard slot; and
a shaft that is disposed in the thru-hole;
wherein the outboard link overhangs the outboard slot and the inboard link contacts the inboard track contact surface.

11. The track idler joint assembly of claim 10 wherein the body of revolution includes a purely extending axial segment that is radially inwardly offset from the outboard track contact surface, and the body of revolution further defines an outboard slot axial width and an outboard slot radial depth measured from the outboard track contact surface to the purely extending axial segment.

12. The track idler joint assembly of claim 11 wherein a ratio of the thru-hole minimum diameter to the outboard slot axial width ranges from 2.5 to 3.5, and a ratio of the thru-hole minimum diameter to the outboard slot radial depth ranges from 7.0 to 8.5.

13. The track idler joint assembly of claim 12 wherein the outboard slot axial width ranges from 50.0 mm to 60.0 mm, the outboard slot radial depth ranges from 15.0 mm to 30.0 mm, and the thru-hole minimum diameter 100.0 mm to 200.0 mm.

14. The track idler joint assembly of claim 10 wherein the body of revolution defines an inboard slot axial width measured from the inboard track contact surface to the second axial extremity, an inboard slot radial depth, a ratio of the thru-hole minimum diameter to the inboard slot axial width ranges from 2.5 to 3.5, and a ratio of the thru-hole minimum diameter to the inboard slot radial depth ranges from 7.0 to 8.5.

15. The track idler joint assembly of claim 14 wherein the inboard slot axial width ranges from 45.0 mm to 55.0 mm, and the inboard slot radial depth ranges from 15.0 mm to 30.0 mm.

16. The track idler joint assembly of claim 15 further comprising a center ridge that defines an overall diameter of the track idler and that is disposed axially between the outboard slot and the inboard track contact surface, and the body of revolution defines an overall axial length of the track idler.

17. The track idler joint assembly of claim 16 wherein the overall diameter of the track idler ranges from 875.0 mm to 975.0 mm, and the overall axial length of the track idler ranges from 300.0 mm to 400.0 mm.

18. The track roller joint assembly of claim 10 wherein the track idler comprises a unitary body of revolution.

* * * * *